UNITED STATES PATENT OFFICE.

WILLIAM C. ARSEM, OF SCHENECTADY, NEW YORK, ASSIGNOR TO GENERAL ELECTRIC COMPANY, A CORPORATION OF NEW YORK.

RESINOUS CONDENSATION PRODUCTS AND PROCESS OF MAKING THE SAME.

1,098,776. Specification of Letters Patent. Patented June 2, 1914.

No Drawing. Application filed September 12, 1912. Serial No. 719,994.

*To all whom it may concern:*

Be it known that I, WILLIAM C. ARSEM, a citizen of the United States, residing at Schenectady, county of Schenectady, State of New York, have invented certain new and useful Improvements in Resinous Condensation Products and Processes of Making the Same, of which the following is a specification.

The present invention comprises a new plastic composition and the process of making the same. Its object is to provide synthetic resinous compositions which in some cases may be rendered insoluble and infusible, and which are suitable for the production of molded articles, electrical insulation, varnishes, etc.

Glycerol and other polyhydric alcohols combine with organic acids, particularly polybasic acids, at an elevated temperature to form resins. These resins apparently are esters of complex molecular structure. Two or more molecules of organic base or alcohol may combine with two or more molecules of acid, the molecular structure probably varying with the proportions and the conditions. Unless special precautions are taken, it is likely that a mixture of various esters, such as mono, di, or tri-acid esters, neutral esters, and perhaps other compounds are formed.

In accordance with my present invention, an ester is formed from a polyhydric alcohol and a polybasic acid in such proportions that free or unesterified hydroxyl groups remain. Such an ester is then combined with another organic acid or acid anhydrid to complete the esterification, thus producing mixed esters of fairly definite composition.

I will illustrate my invention with reference to the formation of a glycerol mixed ester of phthalic acid and succinic acid. Double molecular proportions of glycerol and phthalic anhydrid are first brought into combination to form an ester containing free hydroxyl groups. In accordance with these proportions, about 184 parts of glycerol and 296 parts of phthalic anhydrid, by weight are heated to about 200–210 degrees C. until gas bubbles cease rising. Some thickening takes place but the formation of a jelly is not desired at this point. To the resulting mass, one molecular proportion, or 118 parts by weight, of succinic acid is added and the mixture is heated to a temperature of 210° to 225° C. until it becomes jelly-like or nearly so. Upon cooling this jelly forms a brittle, hard, transparent mass, free from bubbles, which in my opinion is a glycerol ester of phthalic and succinic acids having a cyclic structure and containing perhaps some intermediate products. This material is not fusible but becomes plastic upon heating. This resin apparently is not identical with the material formed when phthalic anhydrid or phthalic acid and succinic acids are reacted upon simultaneously with glycerin. The solidified material may be powdered, and molded under pressure either with or without a filler, such as asbestos or ground slate. The molded product, if desired, may be converted by heating for about a half hour to a temperature of about 200 to 210° C. into a hard, tough condition free from bubbles which will no longer permit shaping when hot. In some cases it is desirable to discontinue the heating of the resin and the succinic acid before the mass becomes a jelly, rendering it more suitable for molding purposes, because of its greater plasticity when hot. In the same manner a di-acid ester of succinic or other polybasic acid may be used as a starting point instead of phthalic ester. The succinic ester having free hydroxyl groups is first prepared by heating 184 parts of glycerol and 236 of succinic acid by weight. These amounts are in double molecular proportions. The heating is continued at about 200–210° C. until gas bubbles cease to be formed. One molecular proportion of phthalic anhydrid, that is, 148 parts by weight, is added to the ester and the heating continued at 210–225° C. until the mass becomes jelly-like. This product when cold is slightly elastic and will recover when stretched similar to rubber. The compound when heated for a short time loses its flexibility and becomes a strong, tough, clear solid mass, free from bubbles. It is infusible and is insoluble in the usual solvents. All these resins, in my opinion, are esters having a molecular structure comprising two like radicals of acid and an unlike radical. In some cases mixtures may be prepared. For example, instead of using two molecules of acid A and one of acid B, I may use more of acid A, say two and one-half molecules of acid A and one-half of acid B. The product will then be a mixture of an ester of acid A with a mixed ester of acids A and B. In the same manner glycerol esters of other organic acids, for example, of tartaric, glutaric, camphoric, malic acids in which not all the hydroxyl groups of the alcohol radical have been esterified may be treated with an additional portion of acid to complete the esterification. In fact the ester of an acid such as phthalic, containing unesterified hydroxyl groups in some cases may to advantage be treated with an additional amount f phthalic anhydrid to form a neutral cyclic ester. The procedure also applies to resins of polyhydric alcohols other than glycerol, for example, glycol, mannitol and others. Other dibasic acids may be used to esterify the remaining hydroxyl groups, and also equivalent amounts of various monobasic acids, and substituted dibasic or monobasic acids, may be employed. For example, I may use propionic, stearic, palmitic, oleic, benzoic acids, or such substituted acids as lactic, salicylic, glycollic, chloracetic, chlorbenzoic, and chlorpropionic. In fact, mixtures of these acids may be used in some cases. Various substances not strictly acids but having acid properties may be employed. For example, 240 parts of the glyceryl phthalate may be acted upon by 279 parts of colophony, an acid anhydrid, to form a hard, reddish-brown resin which is not the equivalent of a simple mixture of phthalic resin and colophony. Stearic acid when combined with the phthalic ester forms a soft substance resembling paraffin, having high insulating properties. This material is soluble in some of the heavy hydrocarbon oils. A diglyceryl di-phthalate treated in the described manner with lactic acid results in a condensation product of relatively low flow point and great plasticity. A material made from two molecular proportions of glycerin, two molecular proportions of phthalic anhydrid and two molecular proportions of lactic acid has a flow-point of 64° C. and is somewhat sticky. When the proportion of lactic acid is decreased and that of phthalic anhydrid increased the flow point is raised and the substance acquires the property of hardening upon heating.

A resin made by using as above described, one molecular proportion of glycerol, one molecular proportion of phthalic anhydrid and one molecular proportion of monochloracetic acid has a flow point of 64.5° C., and is pliable and sticky. Using one molecular proportion of glycerol, 1⅜ of phthalic anhydrid and ¼ molecular proportion of chloracetic acid has a flow point of 88° C. is hard and brittle and has the property of becoming infusible when heated to 160° C. for about eight hours.

What I claim as new and desire to secure by Letters Patent of the United States, is,

1. The process which consists in heating an ester formed by the interaction of a trihydric alcohol and a dibasic acid in substantially double molecular proportions with one molecular proportion of dibasic acid until combination has taken place.

2. The process which consists in heating an ester formed by the interaction of glycerol and phthalic anhydrid and containing unesterified hydroxyl groups with another portion of polybasic acid until a jelly-like mass is formed.

3. The process which consists in heating a glycerol resin of phthalic anhydrid containing unesterified hydroxyl groups with succinic acid until a jelly-like mass has been formed.

4. The process which consists in heating a polyhydric alcohol and a polybasic acid in proportions to form an ester having alcoholic properties, adding another portion of an acid, heating to complete esterification, shaping the resulting plastic mass as indicated by the formation of a jelly-like mass becoming hard on cooling, and then heating the resulting resin-like ester to further polymerize and harden the same.

5. A composition of matter, comprising a neutral mixed cyclic ester of a polyhydric alcohol, phthalic acid and succinic acid, said material being hard, tough, fusible and soluble in common organic solvents and convertible to an insoluble, infusible state by heating.

6. A composition of matter, comprising a mixed glycerol ester of at least two polybasic acids.

7. A composition of matter, a clear, plastic resinous composition, comprising the glycerol double ester of phthalic and succinic acids, convertible to a strong, hard, tough, homogeneous state in which it is nonplastic when heated.

In witness whereof, I have hereunto set my hand this 23rd day of August 1912.

WILLIAM C. ARSEM.

Witnesses:
BENJAMIN B. HULL,
MARGARET E. WOOLLEY.